Patented Oct. 14, 1941

2,259,141

UNITED STATES PATENT OFFICE 2,259,141

SYNTHETIC RUBBERLIKE RESINOUS COMPOSITIONS

John J. Russell, Schenectady, N. Y., assignor to General Electric Company, a corporation of New York No Drawing. Original application April 12, 1938, Serial No. 201,563. Divided and this application November 17, 1939, Serial No. 304,969

2 Claims. (Cl. 260—36)

This application is a division of my copending application Serial No. 201,563, filed April 12, 1938, and assigned to the assignee of the present invention.

This invention relates generally to synthetic rubber-like resinous compositions and particularly to compositions comprising polyvinyl halide.

As is known, a polyvinyl halide, such as polyvinyl chloride, may be plasticized to yield synthetic rubber-like compositions. The most common plasticizer for this purpose is tricresyl phosphate. Polyvinyl halide compositions plasticized with tricresyl phosphate have, however, a relatively narrow temperature range in which they possess rubber-like properties and this materially limits their usefulness particularly at low temperatures. For example, a composition containing 60% polyvinyl chloride and 40% tricresyl phosphate, will break on flexing at temperatures below 0° F. Another, though less serious limitation, to its use as electrical insulation, is the tendency of the composition to lose plasticizer at elevated temperatures. Thus under certain accelerated test conditions it may lose as much as 55% of tricresyl phosphate at 125° C. over a period of 100 hours.

The ideal plasticizer for polyvinyl halide compositions is one which would impart properties to the plastic composition which will fit it for the following conditions:

1. Ability to withstand mechanical abuse tending to damage it when used as electrical insulation at temperatures as low as −10° F.
2. A minimum loss of plasticizer from the composition under accelerated test at 125° C. for 100 hours.
3. Extrudibility on wire.

By extensive investigation of the subject I have established the following conclusions:

1. Cold temperature flexibility requires the plasticizer to have
    a. A relatively low molecular weight;
    b. A long aliphatic chain;
    c. Few aromatic substituents as possible;
    d. Relatively little branching of the side-chain in the aliphatic substituents.
2. Loss of plasticizer at elevated temperatures is small when the compound is
    a. Of high molecular weight;
    b. Contains many aromatic groups;
    c. Has considerable branching of the side-chains in the aliphatic groups;
    d. Is compact in its structure.

Thus, it is apparent that the problem of finding in one compound all of the properties for the ideal plasticizer is complex. Investigation has, however, led to the discovery of a certain class of compounds which closely approach the ideal plasticizer. I have discovered that esters formed by the esterification of a relatively long chain saturated aliphatic dibasic acid containing at least six carbon atoms in the molecule (that is acids of the general class $(C_nH_{2n-2}O_4)$ where $n$ is at least 6 and preferably 6 to 12 inclusive) and tetrahydrofurfuryl alcohol closely approach the total of the combination of properties desired in a plasticizer to impart low temperature flexibility, high tensile strength and low loss of plasticizer in the plastic composition.

An example of such plasticizer is ditetrahydrofurfuryl sebacate which is a compound possessing some of each of the requirements for the ideal plasticizer. It may be used in any desired proportion to obtain the desired plasticizing effect, for example 60% polyvinyl halide and 40% plasticizer.

Typical aliphatic dibasic acids of the class $(C_nH_{2n-2}O_4)$ having 6 or more carbon atoms from which the esters may be prepared for the purposes of this invention are: adipic, pimelic, suberic, azelaic, sebacic, nonanedicarboxylic, decamethylene-dicarboxylic, etc. The esters may be prepared by esterifying the alcohol and acid in any well known manner.

My invention includes not only the use of the simple esters but also the use with polyvinyl halide of the mixed esters and mixtures of the simple esters of the class described and in addition mixtures of these with other plasticizers for polyvinyl halides, such as, for example, in addition to tricresyl phosphate, acetylated esters of ricinoleic acid, acetylated esters of polymerized ricinoleic acid and others including such plasticizers as are mentioned in Semon Patent No. 1,929,453 of Oct. 10, 1933. Obviously, the properties of the plastic compositions will vary with the proportions of the various plasticizers used and in each case the proportions chosen must be suited to the properties desired in the product and the conditions of use.

What I claim as new and desire to secure by Letters Patent of the United States is:

1. Polyvinyl halide plasticized with a tetrahydrofurfuryl ester of an aliphatic dibasic acid of the class $C_nH_{2n-2}O_4$, where $n$ is at least 6.
2. Polyvinyl chloride plasticized with ditetrahydrofurfuryl sebacate.

JOHN J. RUSSELL.